(12) United States Patent
Sielatycki et al.

(10) Patent No.: US 10,740,828 B2
(45) Date of Patent: *Aug. 11, 2020

(54) METHOD AND SYSTEM FOR WEB-BASED INVENTORY CONTROL AND AUTOMATIC ORDER CALCULATOR

(71) Applicant: HemaSource, Inc., West Jordan, UT (US)

(72) Inventors: James J. Sielatycki, Sandy, UT (US); James B. Riter, Holladay, UT (US); Martha M. Riter, Sandy, UT (US)

(73) Assignee: HemaSource, Inc., West Jordan, UT (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/869,893

(22) Filed: Jan. 12, 2018

(65) Prior Publication Data

US 2018/0137558 A1     May 17, 2018

Related U.S. Application Data

(63) Continuation of application No. 13/414,415, filed on Mar. 7, 2012, now Pat. No. 9,870,584, which is a continuation of application No. 10/866,426, filed on Jun. 10, 2004, now abandoned.

(51) Int. Cl.
   *G06Q 30/06* (2012.01)
   *G06Q 10/08* (2012.01)

(52) U.S. Cl.
   CPC ......... *G06Q 30/0635* (2013.01); *G06Q 10/08* (2013.01)

(58) Field of Classification Search
   CPC .... G06Q 10/08; G06Q 30/0635; G06Q 10/00; G06Q 10/063

USPC ......... 705/28, 29, 26.1, 15; 235/385; 700/95
See application file for complete search history.

(56) References Cited

U.S. PATENT DOCUMENTS

| | | | |
|---|---|---|---|
| 4,107,784 A | 8/1978 | Van Bemmelen |
| 4,827,395 A | 5/1989 | Anders et al. |
| 5,101,352 A | 3/1992 | Rembert |
| 5,168,445 A | 12/1992 | Kawashima et al. |
| 5,570,291 A | 10/1996 | Dudle et al. |
| 5,666,530 A | 9/1997 | Clark et al. |
| 5,819,232 A | 10/1998 | Shipman |
| 5,974,238 A | 10/1999 | Chase, Jr. |
| 6,292,547 B1 | 9/2001 | Katz |
| 6,317,797 B2 | 11/2001 | Clark et al. |
| 6,349,134 B1 | 2/2002 | Katz |
| 6,449,346 B1 | 9/2002 | Katz |
| 6,609,101 B1 | 8/2003 | Landvater |
| 6,996,538 B2 | 2/2006 | Lucas |

(Continued)

OTHER PUBLICATIONS

Final Office Action for U.S. Appl. No. 10/866,426, dated Aug. 25, 2009.

(Continued)

*Primary Examiner* — Vanel Frenel
(74) *Attorney, Agent, or Firm* — Foley & Lardner LLP

(57) ABSTRACT

A method and system for providing order placement and inventory control, integrating customers and suppliers and using both real-time and historical data to provide an automated process for the management of inventory. Various embodiments of this invention can include such features as automatic order placement, usage factor analysis, waste factor analysis, inventory analysis and reconciling of inventory data.

20 Claims, 11 Drawing Sheets

(56) References Cited

U.S. PATENT DOCUMENTS

| | | | |
|---|---|---|---|
| 7,085,729 | B1 | 8/2006 | Kennedy et al. |
| 7,117,162 | B1 | 10/2006 | Seal et al. |
| 7,249,044 | B2 | 7/2007 | Kumar et al. |
| 7,668,761 | B2 | 2/2010 | Jenkins et al. |
| 2001/0051905 | A1 | 12/2001 | Lucas |
| 2002/0116301 | A1 | 8/2002 | Chapman et al. |
| 2002/0156707 | A1 | 10/2002 | Reid et al. |
| 2002/0161674 | A1 | 10/2002 | Scheer |
| 2002/0188499 | A1 | 12/2002 | Jenkins et al. |
| 2003/0139982 | A1 | 7/2003 | Schwartz et al. |
| 2003/0216975 | A1 | 11/2003 | Montey et al. |
| 2004/0059649 | A1 | 3/2004 | Sakuma et al. |
| 2004/0103048 | A1 | 5/2004 | Vitulli et al. |
| 2004/0107141 | A1 | 6/2004 | Conkel et al. |
| 2004/0111326 | A1 | 6/2004 | Rock et al. |
| 2005/0004682 | A1 | 1/2005 | Gaddis et al. |
| 2005/0075949 | A1 | 4/2005 | Uhrig et al. |
| 2007/0162360 | A1 | 7/2007 | Congram et al. |
| 2008/0275796 | A1 | 11/2008 | Katircioglu |

OTHER PUBLICATIONS

U.S. Office Action for U.S. Appl. No. 10/866,426, dated Dec. 8, 2011.
U.S. Notice of Allowance for U.S. Appl. No. 13/414,415 dated Sep. 11, 2017.
U.S. Office Action for U.S. Appl. No. 10/866,426, dated Apr. 23, 2008.
U.S. Office Action for U.S. Appl. No. 10/866,426, dated Jan. 7, 2011.
U.S. Office Action for U.S. Appl. No. 10/866,426, dated Jun. 21, 2010.
U.S. Office Action for U.S. Appl. No. 10/866,426, dated Nov. 13, 2008.
U.S. Office Action for U.S. Appl. No. 13/414,415, dated Apr. 4, 2014.
U.S. Office Action for U.S. Appl. No. 13/414,415, dated Feb. 7, 2017.
U.S. Office Action for U.S. Appl. No. 13/414,415, dated May 4, 2016.
U.S Office Action for U.S. Appl. No. 13/414,415, dated Nov. 28, 2017.
U.S. Office Action for U.S. Appl. No. 13/414,415, dated Nov. 28, 2014.

METHOD AND SYSTEM FOR WEB-BASED INVENTORY CONTROL AND AUTOMATIC ORDER CALCULATOR

CROSS-REFERENCE TO RELATED PATENT APPLICATIONS

This patent application is a continuation of, and claims priority to and the benefit of U.S. patent application Ser. No. 13/414,415, titled "METHOD AND SYSTEM FOR WEB-BASED INVENTORY CONTROL AND AUTOMATIC ORDER CALCULATOR," and filed Mar. 7, 2012, which claims priority to and the benefit of U.S. Non-Provisional Application Ser. No. 10/866,426, titled "METHOD AND SYSTEM FOR WEB-BASED INVENTORY CONTROL AND AUTOMATIC ORDER CALCULATOR" and filed on Jun. 10, 2004. The contents all of which are incorporated herein by reference in its entirety.

BACKGROUND

Field of the Invention

This invention relates to methods and systems for inventory control. More specifically, this invention relates to Web-based inventory control methods and systems that can perform automatic order calculation and placement.

Description of Related Art

A variety of Inventory techniques are well known in the art. Generally, these prior techniques are not adapted to integrate on-line tools with suppliers and/or distributors for tracking inventory, nor do these prior techniques typically include a sophisticated order calculator.

Although the following documents may not necessarily qualify as "prior art," the reader is referred to these U.S. patent documents for general background material. Each of these documents is hereby incorporated by reference in its entirety for the material contained therein.

U.S. Pat. No. 4,107,784 describes a management control terminal.

U.S. Pat. No. 4,827,395 describes a system for controlling manufacturing systems.

U.S. Pat. No. 5,101,352 describes an integrated MRP system for distributors, manufacture and job shops.

U.S. Pat. Nos. 5,666,530 and 6,317,797 B2 describe systems for automatic synchronization of common files between portable computer and host computer.

U.S. Pat. No. 5,974,238 describes an apparatus for performing dynamic synchronization between data stored in a handheld computer and a host computer.

U.S. Pat. Nos. 6,292,547 B1, 6,39,134 B1 and 6,449,346 B1 describe a telephone-television interface statistical analysis system.

SUMMARY OF THE INVENTION

It is desirable to provide a method and system for inventory and order calculation. It is particularly desirable to provide such a method and system that uses a web-based inventory control system and which provides an order calculator which accounts for prior order history, usage rates, waste rates, safety stock requirements, order period length and projected future production as well as estimated and/or actual on-hand inventory.

Accordingly, it is an object of an embodiment of this invention to provide a method and system for inventory control and order calculation that provides an accurate, predictable method for replenishing supplies.

It is another object of an embodiment of this invention to provide a method and system for inventory control and order calculation that reduces excess inventory costs.

It is a further object of an embodiment of this invention to provide a method and system for inventory control and order calculation that reduces the need for rush shipments, which rush shipments occur as a result of inaccurate ordering when replenishing supplies.

It is a still further object of an embodiment of this invention to provide a method and system for inventory control and order calculation that provides the capability of identifying and reducing waste.

Another object of an embodiment of this invention to provide a method and system for inventory control and order calculation that provides the ability to track key inventory of component parts that are critical to the completion of a procedure.

A still further object of an embodiment of this invention is to provide a method and system for inventory control and order calculation that includes an integrated set of online software tools for automatically loading and tracking orders.

In various embodiments of this invention some, all and/or combinations of the above cited objects and/or additional objects may be incorporated in this invention. Additional objects, advantages and other novel features of this invention will be set forth in part in the description that follows and in part will be apparent to those skilled in the art upon examination of the following or may be learned with the practice of the invention. Still other objects of the present invention will become readily apparent to those skilled in the art from the following description, wherein there is shown and described the present preferred embodiments of the invention, simply by way of illustration of the several modes best suited to carry out this invention. The objects and advantages of this invention may be realized and attained by means of the instrumentalities and combinations particularly pointed out in the appended claims. As it will be realized, this invention is capable of other different embodiments, and its several details, specific components and steps are capable of modification in various aspects without departing from the concept of this invention. Accordingly, these objects and the following drawings and descriptions should be regarded as illustrative in nature and not as restrictive.

BRIEF DESCRIPTION OF THE DRAWINGS

The accompanying drawings, incorporated in and forming a part of the specification, illustrate a present preferred embodiment of the invention. Some, although not all, alternative embodiments are described in the following description.

In the drawings.

Reference will now be made in detail to the present preferred embodiment of the invention, an example of which is illustrated in the accompanying drawings.

DETAILED DESCRIPTION

This invention in its present preferred embodiment is a web-based inventory control system and method. It is specifically designed to assist the people who order supplies and maintain inventory for the requirements of an organization. In particular, this invention can improve supply replenishment through order accuracy, assists in the reduction of excess inventory, reduces rush shipments caused by inaccurate ordering, and identifies and reduces waste.

Within the process of this invention a variety of procedures are provided, which are integrated into the system of this invention to provide an inventory control, supply replenishment and order placement solution. In its most preferred embodiment, this invention can be integrated with a distributor's accounting system and the, customer's ordering process and/or accounting system, thereby providing "real time" data that can be transmitted, stored and retrieved to permit those parties within the supply chain to identify, manage and control ancillary costs associated with the procurement, replenishment and storage of supplies related to an organizational requirement or a general purchasing pattern. Also, the preferred embodiment of this invention includes links to the shippers tracking system, thereby providing the integrated capability of monitoring up-to-date shipment tracking information. Although throughout the description that follows the steps of the method and procedures are presented in a particular order, generally this is for the convenience of this description and should not be interpreted to imply any particular order being required.

Figure 1:
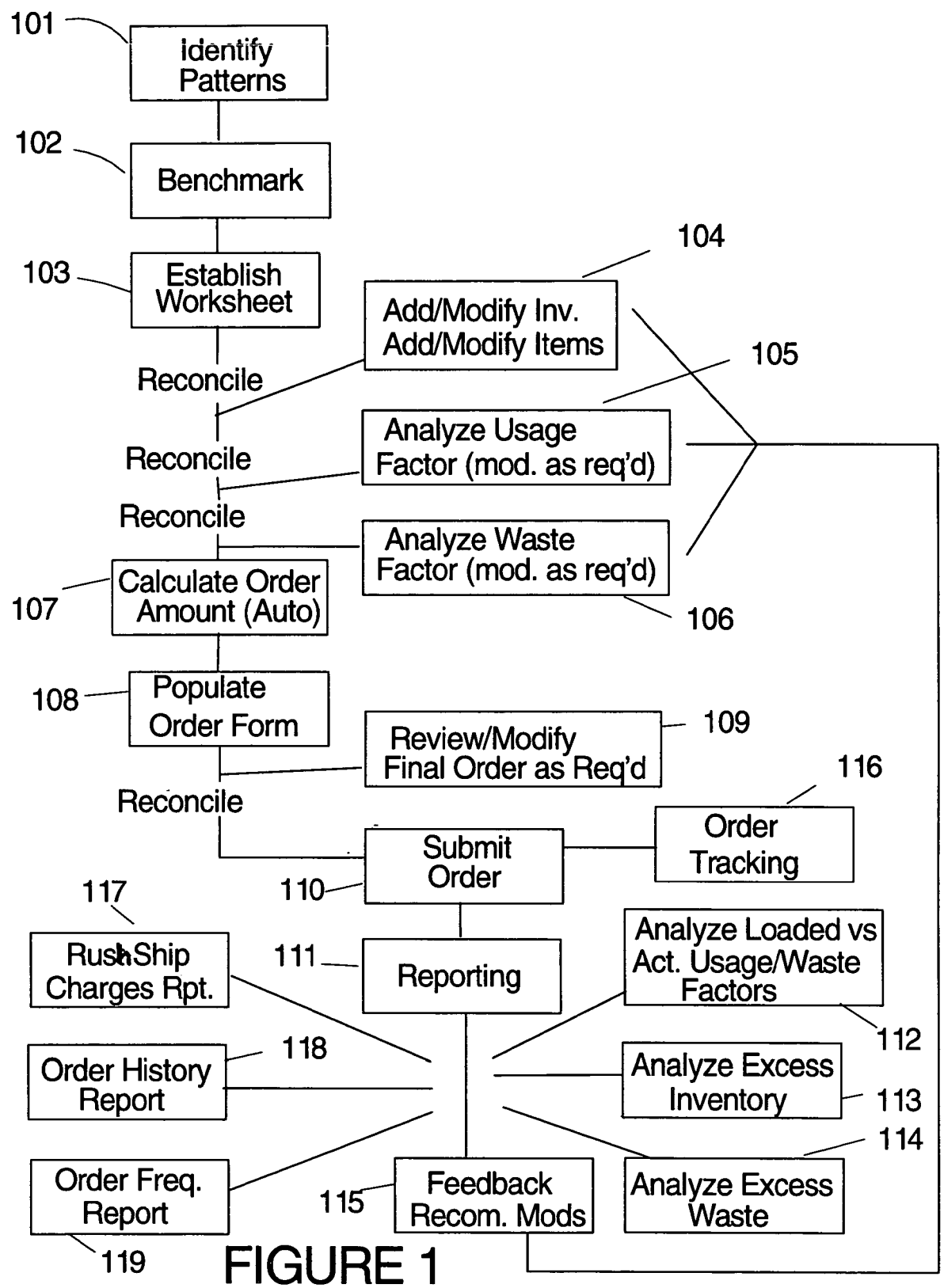
FIG. 1 is a top-level flow chart of the present steps of the process of this invention.

FIG. 1 shows a top-level flow chart of the present steps of the process of this invention. Purchasing patterns and costs are identified 101. Benchmarking 102 is performed to capture historical data and identify trends. An order worksheet is established 103. Inventory items contained in the order worksheet information in 103 can be added, removed, reconciled, analyzed for accuracy, and modified as necessary 104, 105, 106. The order is calculated 107, using the Automatic Order Calculator of this invention. The order form is populated 108 with reference to the required inventory need. This need is calculated with consideration being given to the estimated or actual current inventory on-hand, receipts since the last order period, usage and waste factors, safety stock requirements, the order period length, and projected number of procedures forecasted until the next anticipated order date. The populated order form can be reviewed by the user and modified as deemed necessary 109. After final review, the order is submitted 110. Order tracking 116 can then be instigated. At any time, there is a reporting mechanism available 111 that will generate information critical to the reconciliation process of the invention. Reports are generated that analyze the currently loaded estimated waste and usage factors 112. This report compares the expected to the calculated factors derived from actual usage per procedure 112. Actual inventory is compared to calculated (estimated) inventory and excess values are displayed to analyze excess inventory 113 to identify where inventory costs can be reduced. Actual waste is compared to expected waste and the value of the excess waste is displayed 114 to identify where excessive waste can be reduced. The feedback 115 from the reporting mechanism will generate recommendations to existing usage and waste factors so that the inventory replenishment process can be continuously improved as new information is generated. Reports can also include, but are not necessarily limited to, rush shipping charges 117, an order history report 118 and an order frequency report 119. This can also be used to verify and monitor ordering accuracy and efficiency.

Figure 2:
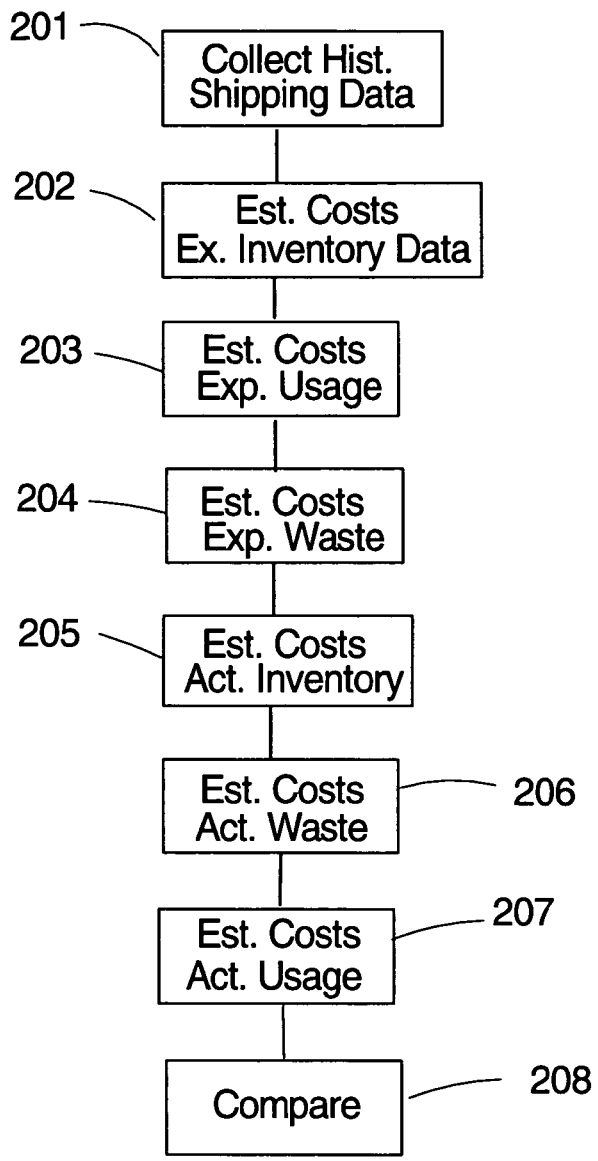
FIG. 2 is a detailed flow chart of the benchmarking process of this invention.

FIG. 2 shows a detailed flow chart of the benchmarking process of this invention. Benchmarking 102 is used to collect and compare ordering patterns and costs for the purpose of future ordering and/or analysis of the costs of inventory and shipment. Historical ordering data and shipping, especially "rush" shipping data is collected 201 and is a component of the system of this invention. Inventory data, including estimated excess inventory data, is collected 202 and loaded into the system of this invention. Estimated actual usage and waste factors, including estimated costs for expected usage 203, estimated costs for expected waste 204 and estimated costs of actual inventory 205 are loaded. The estimated costs of actual inventory 205, actual usage 207 and actual waste 206 are established. A comparison 208 is made between the expected and the actual costs of inventory, usage rates, and waste rates.

Figure 3:
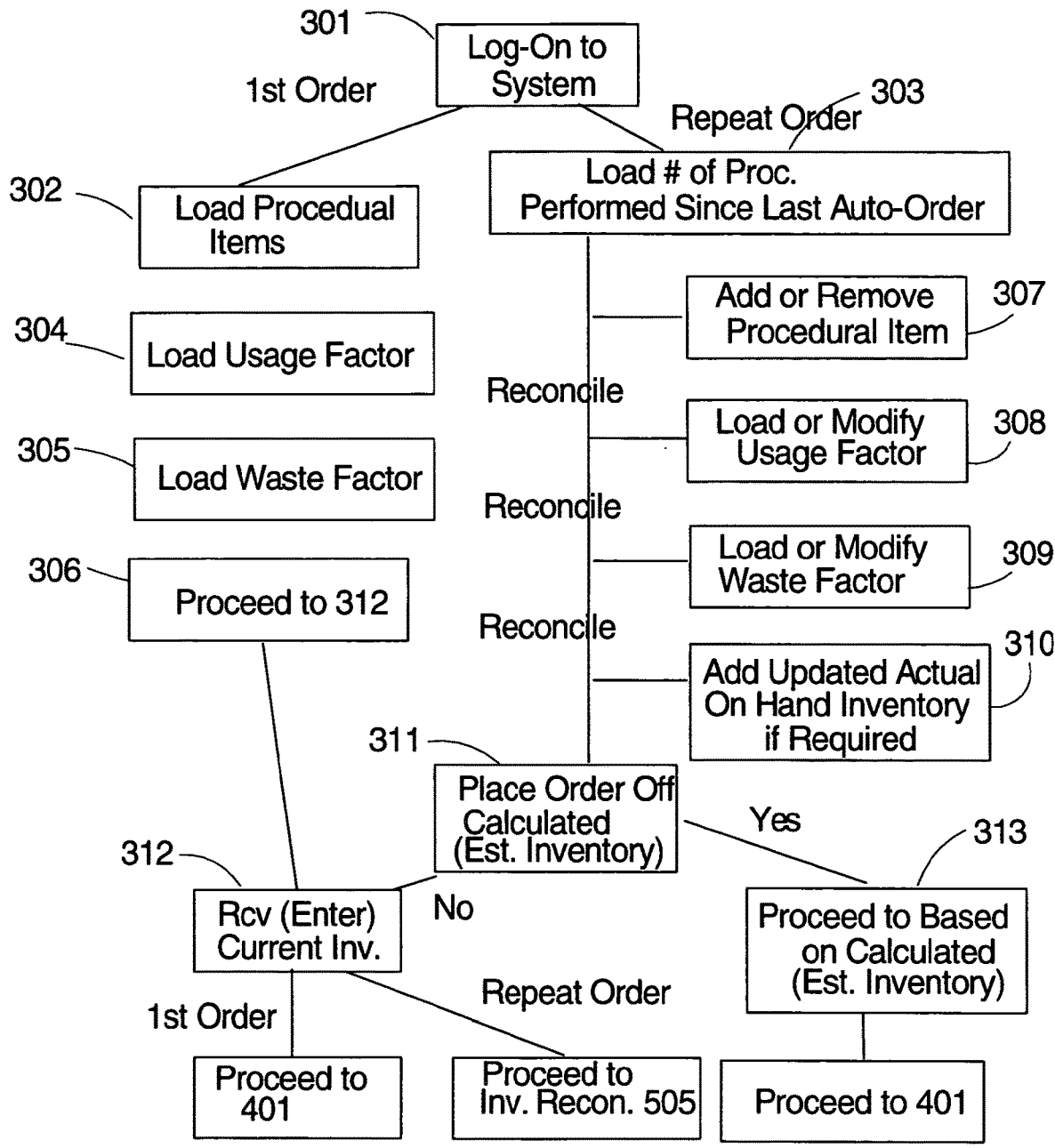
FIG. 3 is a detailed flow chart of the Worksheet Establishment process of this invention.

FIG. 3 shows a detailed flow chart of the Worksheet Establishment process of this invention. The inventory control worksheet allows customers to add a customized product list to the order calculation system of this invention. This system takes information, such as inventory reorder period, days of inventory on-hand desired, usage factors for each product and the requirements (or estimated number of procedures) for a period, and calculates an estimated quantity for reordering. The information filled in the worksheet by users and the system is saved to be used in future calculations. In the present embodiment, to establish 103 the inventory control worksheet, the user logs on 301 to the system using a User Name and Password. If this is the first order, selected procedural items are then loaded 302 into the system and assigned a usage factor 304 and a waste factor 305. These items and factors can be modified or removed as necessary by activating a modify/remove button on the Inventory/Order Calculator. Once the procedural items have been loaded 302 and the usage 304 and waste factors 305 have been assigned, the process proceeds 306 to entering or receiving the current inventory 312 into the system for each item. After all of the inventory information is received, an automatic order is ready to be placed. If this is the first use of the invention, the next step is to proceed to order placement 401, discussed in FIG. 4 below. If this is not the first use of the invention, after logging onto the system in 301 the user will load 303 the number of procedures (requirements) performed since the last order was placed. Reconciliation of the Items required 307, usage factors 308, waste factors 309, and on-hand inventory 310 can be modified as deemed necessary via the reconciliation process. In 311, a determination is made as to whether an order is to be placed based off of calculated (estimated) inventory on-hand or actual inventory on-hand. The actual inventory on-hand is obtained from a current physical count of items at the facility. If the order is going to be placed based calculated inventory, the user will then proceed to step 401 as described in FIG. 4 below. In the present preferred embodiment of this invention the calculated inventory on-hand 313 is determined as follows: The requirement or number of procedures (NP) is multiplied by the number of items needed per procedure (P) which is multiplied by the waste factor (U) (waste factor is equal to 1 plus the historical waste percentage, for example a waste percentage of 20% would lead to a waste factor of 1.2). The result (NP×P×U) is subtracted from the beginning inventory (B). Receipts (R) received since the previous order is added. The resulting calculation will produce the calculated estimation of inventory on-hand (Q). In summary, the formula is $$Q = (B+R) - (NP \times P \times U).$$

Figure 5:
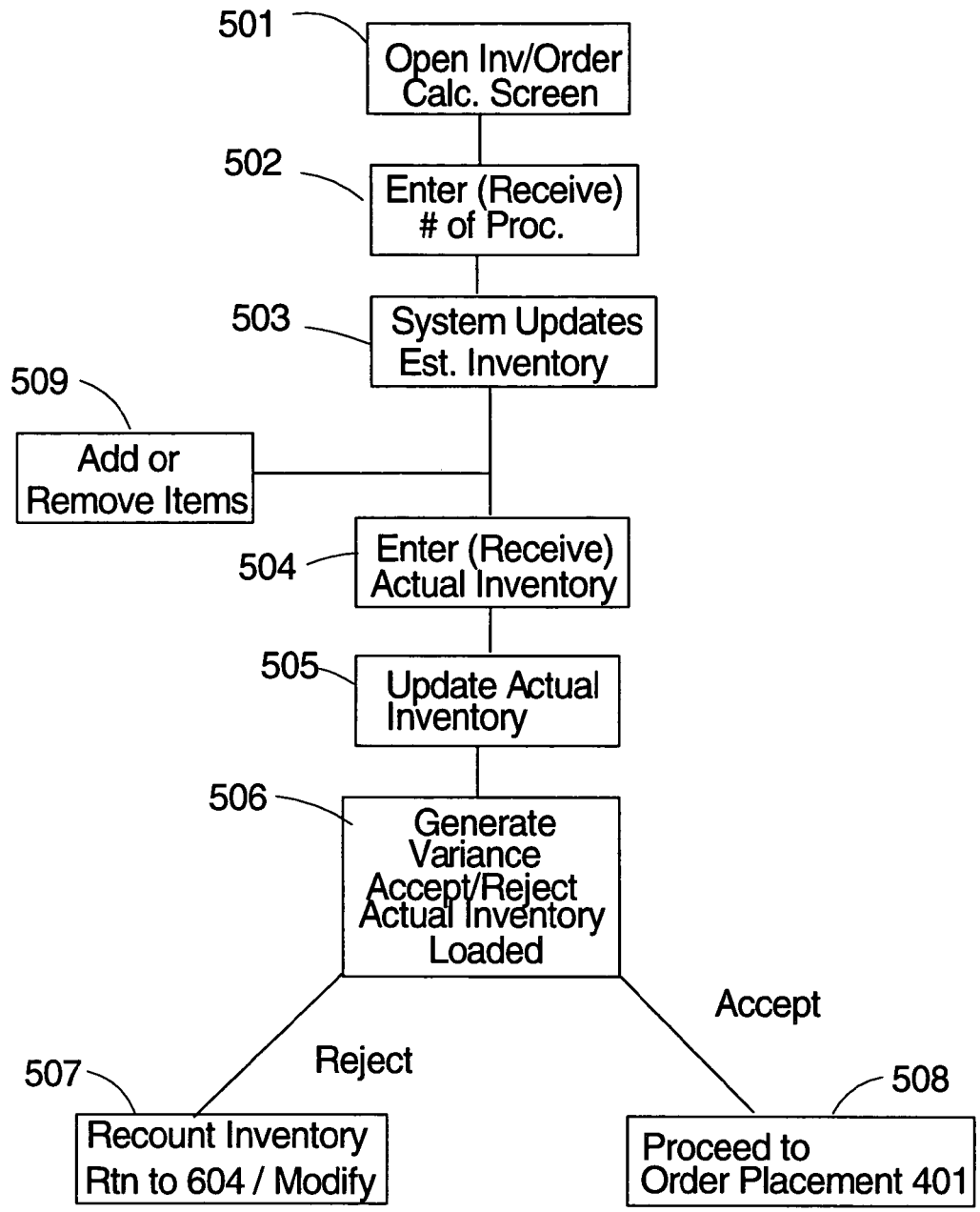
FIG. 5 is a detailed flow chart of the Reconcile process for the loading of actual on-hand inventory of this invention.

If it is determined at step 311 that the order is to be placed based off of a current actual on-hand count of the inventory, an inventory reconciliation process as described in step 505 of FIG. 5 of the invention will typically be performed.

Figure 4:
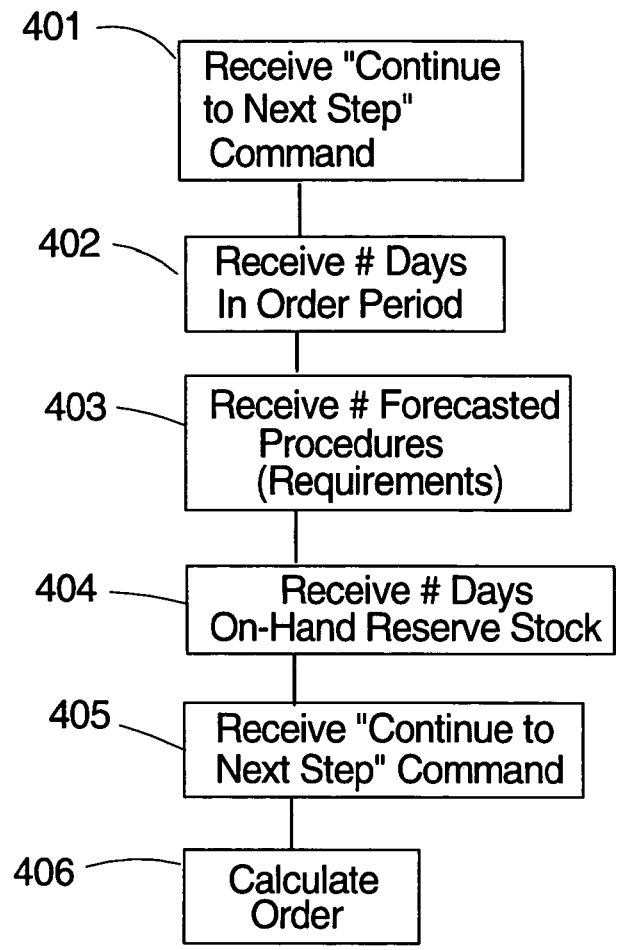
FIG. 4 is a detailed flow chart of the Order Placement process of this invention.

FIG. 4 shows a detailed flow chart of the Order Placement process of this invention. The automatic order calculation 107 allows customers to place a semi-automated order based on the parameters from the Inventory Control Worksheet. Customers are able to calculate the order and place it, typically with only a few "mouse" clicks. Customers can review the order and modify it as desired prior to submitting it. The "Continue to Next Step" command is made 401. The Automatic Order Placement screen is presented and the number of days in the order period is received 402, the number of forecasted requirements (or procedures) is received 403, and the number of days of reserve, on-hand inventory is received 404. Then another "Continue to Next Step" command is executed 405 and the order is calculated 406 based primarily on the data received in steps 402, 403 and 404 along with the historical order data established during benchmarking 102. In the present embodiment of the invention, the quantity to be ordered is determined as follows: The forecast requirements or forecast procedures (PF) is divided by the estimated length of the next period (EL) resulting in a value of PF/EL. The waste factor (U) is multiplied by the number of items needed per procedure (P) resulting in a value of U*P. The estimated length of the next period (EL) is added to the days of reserve (RI) resulting in a value of EL+RI. The results are multiplied together resulting in (PF/EL)*(U*P)*(EL+RI), the result of which has the inventory on-hand (Q) subtracted therefrom.

FIG. 5 shows a detailed flow chart of the actual on-hand inventory reconciliation process of this invention 106. Reconciling 104 is done to verify that a customer's actual inventory and their calculated inventory are the same, and to correct any errors that are detected. The Inventory/Order Calculator screen is opened 501. The requirements or number of procedures performed since the last period is entered 502. The inventory column is updated 503 to reflect the estimated on-hand inventory. Items may be added or removed 509. The actual inventory is entered 504 based typically on a physical count of the items at all of their locations. The actual inventory is updated 505 and in the present embodiment is entered in the on-hand inventory column of the Inventory/Order Calculator Screen. During this step, in the present embodiment the variance between the actual and estimated values of inventory is generated and displayed 506. A large variance can prompt the user to investigate further, either with a double check of the actual on-hand inventory and/or further investigation to determine why usage and/or waste varied from the expected value 507. The reconciliation process can be repeated as necessary until the customer is satisfied that the value is accurate. The reconciliation if finalized through the completion and submission 508 of an order using the Automatic Order Calculator. When the order is submitted, the revised actual on-hand inventory values are updated, stored and carried forward for use in processing future orders.

Figure 6:
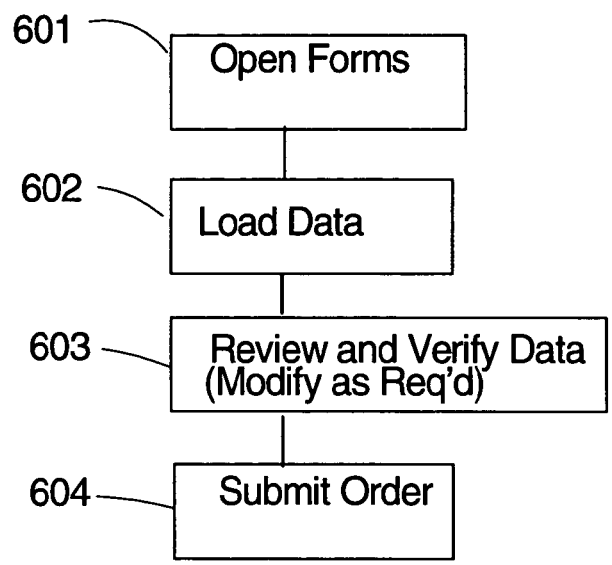
FIG. 6 is a detailed flow chart of the Order Form Population process of this invention.

FIG. 6 shows a detailed flow chart of the Order Form Population process of this invention. The on-line order form is populated 108 with the inventory items needed to meet the customer's requirements through the next ordering period. In the present embodiment, this is accomplished by opening 601 an electronic form, loading 602 in the provided locations on the form the designations of items to be ordered along with quantity and pricing information. The displayed Order Form data is then verified 603, reviewed and modified as deemed appropriate, and then submitted 604 for order processing.

Figure 7:
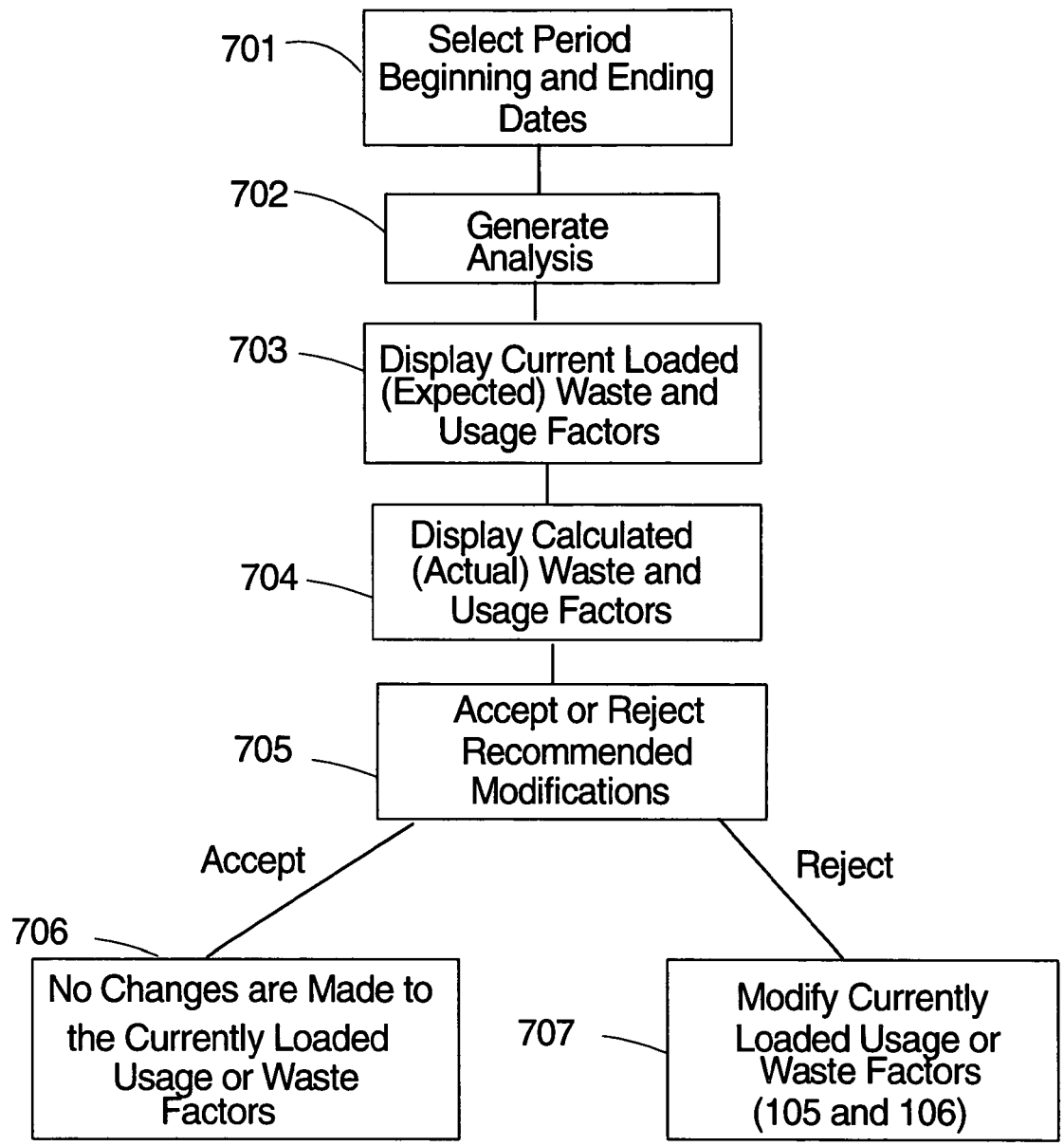
FIG. 7 is a detailed flow chart of another reconciliation process of this invention, the Usage and Waste Factor Analysis.

FIG. 7 shows a detailed flow chart of the Usage and Waste Factor Analysis 112 process of this invention. Information generated in the reconciliation process 112 will compare expected waste and expected usage to actual waste and actual usage. Generated recommendations can be implemented at steps 105 and 106. The generation of actual usage factors and waste rate information is also used to further extrapolate and analyze the cost of excess waste and excess inventory. These analyses and reports provide informational feedback that can then be used to modify the expected usage and waste factors. The net affect of the modification will be to reduce excess inventory and waste. When the worksheet for the Automatic Order Calculator within the Inventory Control Module is first established, the loaded usage and waste factors are merely estimations based on benchmarked purchase history and/or first-hand knowledge of usage patterns. To generate these estimates, the purchase history is correlated to the number of procedures (requirements). This will establish an estimated pattern of usage per procedure. The calculation is performed for each item contained in the worksheet. After an Automatic Order Calculator has been submitted at least twice while utilizing an actual on-hand inventory, the Usage & Waste Factor Analysis Report 112 within the Inventory Control Module can be generated. It is used in the reconciliation and feedback process of the invention. It compares expected factors to actual factors and makes recommendations for modifications. This analysis is a mathematical tool that will assist users in determining their actual usage per procedure. To generate an analysis for a specified period, the period beginning and ending dates are selected 701. When "Generate Analysis" is selected 702, the analysis will display currently loaded usage factors and waste estimates 703 and compare them to actual (calculated) usage factors and waste based on real practices 704. Recommendations for modifications to usage factors or waste estimates are also displayed 705. If modifications are accepted, the appropriate values are updated in 105 and 106 of the Inventory Control Module and no changes 706 need be made to the currently loaded usage or waste factors. Alternatively, if the recommended 705 modification are rejected, the current loaded usage or waste factors are modified 707 as previously described in FIG. 1.

Estimated Usage Factor=Number of items purchased over a given period/Number of procedures performed over the same period.

Calculated (actual) Waste Factor=(((Beginning Inventory+(Receipts×items) Ending Inventory) (Number of procedures×Number needed per procedure))/(Number of Procedures×Number Needed per Procedure))×100.

Figure 8:
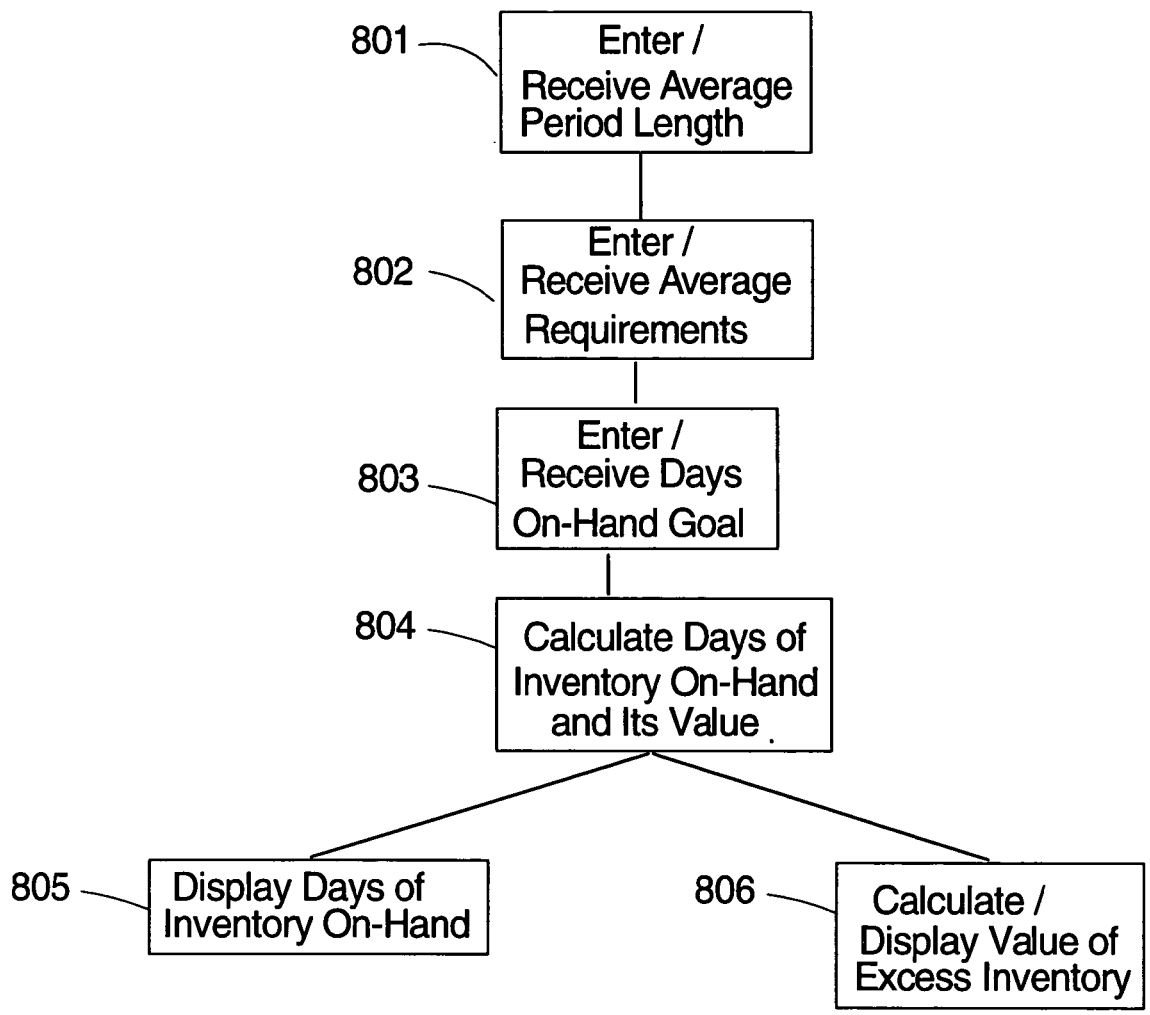
FIG. 8 is a detailed flow chart of a third reconciliation function: the Excess Inventory Analysis process of this invention.

Calculated (actual) Usage Factor=Number Needed Per Procedure×((Waste Factor/100)+1).    Formulas FIG. 8 shows a detailed flow chart of the Excess Inventory Analysis 113 process of this invention. An "Excess Inventory Analysis" page is typically generated to provide customers with a display of the excess inventory information. Although problems with excess inventory are self-correcting with proper use of the Automatic Order Calculator, the Excess Inventory Analysis 113 process is typically used to monitor and verify the progress of the desired reduction in excess inventory. This process allows the user to determine the amount and dollar value of the excess inventory by selecting various parameters such as the length of the average ordering period 801, the average number of requirements or procedures in a period 802, and the customer's goal for on-hand inventory 803. The actual days of inventory on-hand is calculated 804. The days of inventory on-hand is displayed 805. The value of excess inventory and the actual days on-hand is calculated and typically displayed 806. In the present embodiment of the invention, the calculation 804 of days of inventory on-hand is performed as follows: the average number of procedures (AveP) is multiplied by the estimated number of items per procedure (P) the result multiplied by the estimated waste factor (U) and the result being divided by the average period length (AvePL), the result being (AveP*P*U/AvePL). This result is divided into the inventory on-hand (Q), making the calculated days of inventory on-hand equal to Q/((AvePL), the result being Q/(AveP*P*U/AvePL). The present calculation 806 of the value of excess inventory is as follows: the average number of procedures (AveP) is multiplied by the estimated number of items per procedure (P) the result multiplied by the estimated waste factor (U) and the result being divided by the average period length (AvePL), the result being (AveP*P*U/AvePL). This result is multiplied by the average number of procedures (AveP) divided by the average period length (AvePL) and is multiplied by the calculated days of inventory on-hand (Q/(AveP*P*U/AvePL)) minus the days on-hand goal (DO–H) and multiplied by the price per each item (Ppl), making the calculated value of excess inventory equal to [Ppl*(AveP*P*U)/AvePL)]*[((Q/(AveP*P*U/AvePL.))–DO–H)).

Figure 9:
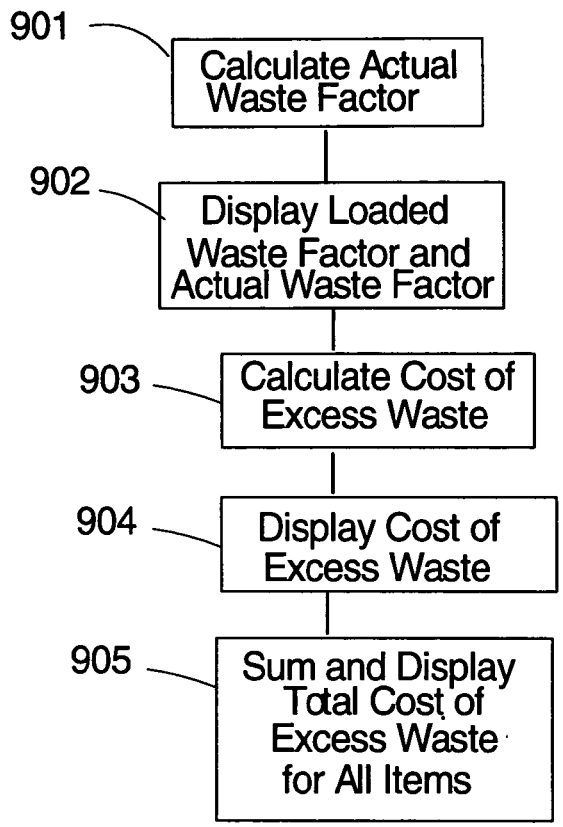
FIG. 9 is a detailed flow chart of a fourth reconciliation function: the Waste Factor Analysis process of this invention.

FIG. 9 shows a detailed flow chart of the Excess Waste Analysis 114 process of this invention. The Excess Waste Analysis 114 uses information from the Inventory Control Worksheet and by applying a waste factor "goal", a waste analysis report can be generated to show customers the estimated amount of waste that is occurring (i.e. overuse of items per procedure or requirement). By adjusting the waste factor "goal" customers can see how it affects their cost per item. After the inventory has been reconciled against actual on-hand inventory, this invention automatically calculates and displays an analysis of expected waste verses actual waste. This information can be used for investigation and identification of opportunities for waste reduction. Typically, this information is used to improve the accuracy of future inventory needs by adjusting the number of items used per procedure or the expected waste values. An "Excess Waste Analysis" page is generated to provide customers with a display of the excess waste information. Although problems with excess waste are usually self-correcting with proper use of the Automatic Order Calculator, the Excess Waste Analysis 114 process is typically used to monitor and verify the progress of the desired reduction in excess waste. In the present embodiment of the invention this is accomplished by calculating 901 the actual waste factor. This actual waste factor is used in the calculation of excess waste and its corresponding value. The loaded waste factor and the actual waste factor are typically displayed 902. The cost of excess waste is calculated 903 and the cost of excess waste, typically with a comparison of actual to expected waste, and is displayed 904. The total cost of the excess waste for all items can be summed and displayed 905. In the present embodiment of the invention the actual waste factor is calculated 901 by the following process: the requirements or number of procedures (NP) are multiplied by the number of items per procedure (P), the result (NP*P) is added to the inventory on hand (Q), the result of which ((NP*P)+Q) is subtracted from the sum of the beginning inventory (B) and the quantity of items shipped (R), the result of which (B+R)–((NP*P)+Q) is divided by the product of the number of procedures (NP) and the number of items needed per procedure (P), the result of which is ((B+R)–((NP*P)+Q))/(NP*P). The actual waste factor is one (1) plus the previous result, accordingly, actual waste factor equals 1+(((B+R)–((NP*P)+Q))/(NP*P)). The calculation 903 of the cost of excess waste in the present embodiment of the invention is calculated as follows: The actual waste factor 1+(((B+R)–((NP*P)+Q))/(NP*P)) is reduced by the expected waste factor (U), the result of which [1+(((B+R)–((NP*P)+Q))/(NP*P))]–U is multiplied by the number of procedures (NP) and by the number of items needed per procedure (P) and the price of each item. Thereby resulting in a cost of excess waste of [(1+(((B+R)–((NP*P)+Q))/(NP*P))) –U]*NP*P*price per item.

Figure 10:
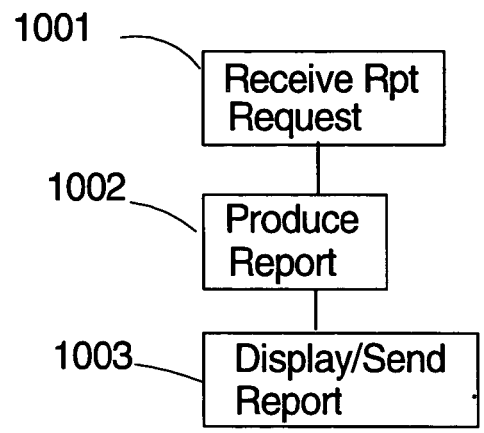
FIG. 10 is a detailed flow chart of the Reporting process of this invention.
Figure 11:
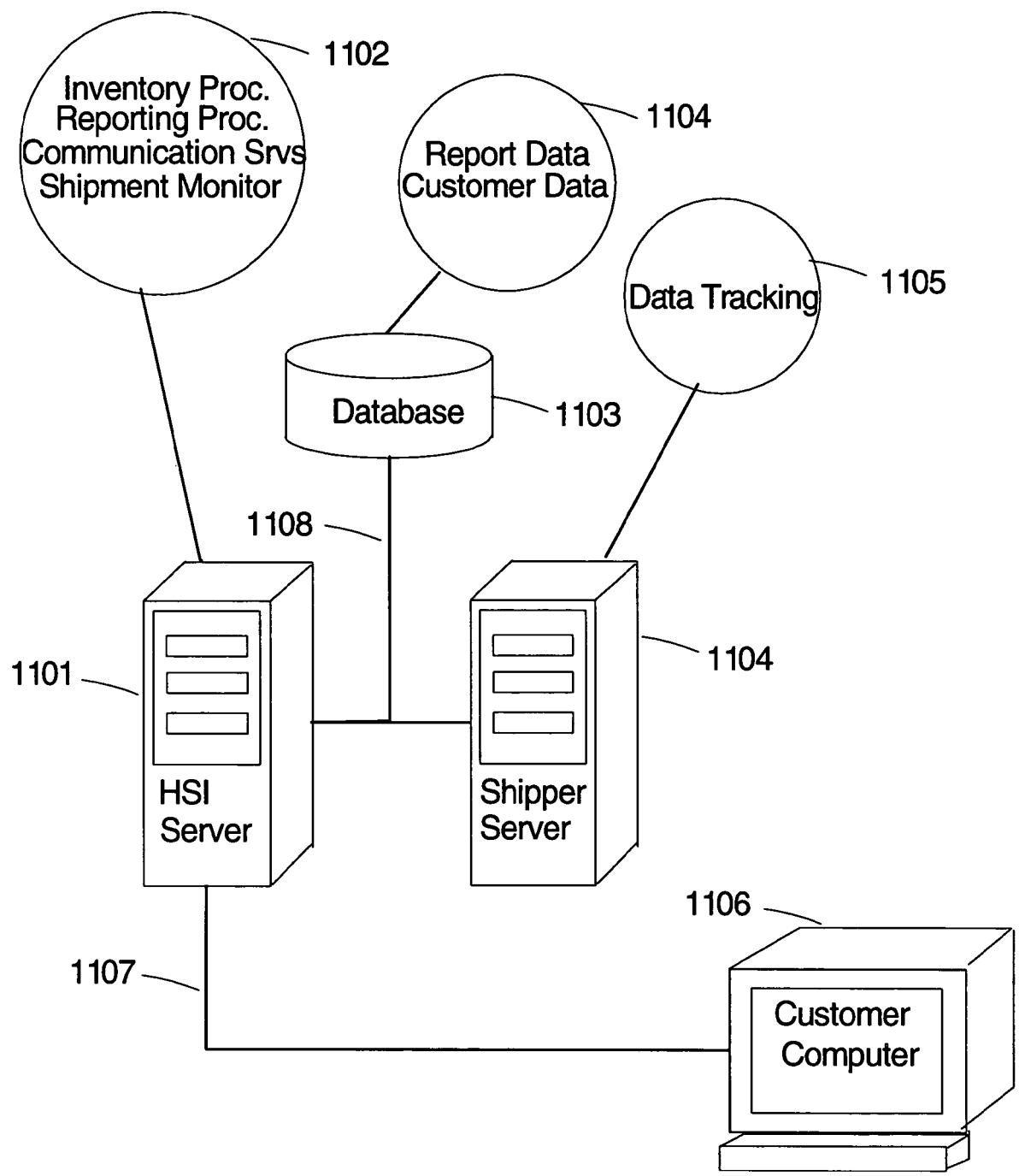
FIG. 11 is a system diagram showing the components used in the process of this invention.

FIG. 10 shows a detailed flow chart of the Reporting 111 process of this invention. The reporting 111 process are provided to monitor and verify ordering efficiency. For example, the order frequency and the progress of the reduction of shipping charges and/or rush shipping charges can be tracked. Included among the reports available are a Summary and a Detail report of past orders. An Order History report and a Rush Shipments report are provided for a historical review. Reports can be printed and/or downloaded for inclusion in other standard programs such as Word or Excel. In the present preferred embodiment of this invention the capability is provided for the user/customer to customize the reports and order templates as desired. The reporting 111 process begins with receiving 1001 a report request, for either a summary or a detailed report. Producing 1002, by gathering and formatting information stored in the database, the filled-in report template. Displaying or sending 1003 the report as desired by the customer. FIG. 11 shows a system diagram of the components used in the process of this invention. The method and process of this invention is typically and preferably executed using standard digital computer hardware. A process (HSI) server 1101 computer performs much of the functionality of the process of this invention, specifically including the inventory process, the reporting process, the communication services and the shipment manager 1102. This server 1101 system presently uses Internet Information Server 5.0 and Active Server Pages (ASP) pages. Presently the preferred hardware of this server 1101 includes an AMD Athlon CPU operating at 800 MHz, with 512 MB of memory, a pair of 20 GB hard disk drives in a RAID 0 configuration. The HSI server 1101 is electrically connected to a database 1103, which stores the report data and the customer data 1104. This database 1103 may be incorporated in the server 1101, may be external to the server 1101 and may be connected 1108 to the to the server via a network connection. A shipper server 1104 is connected, typically over a network interface 1108 to the HSI server 1101, to provide shipper data tracking 1105. The customer computer system 1106 is connected 1107 to the HSI server 1101, typically by a network interface. The typical network interface used throughout the present embodiment of this invention is a World Wide Web Internet interface, that may be a dedicated direct connection, a dial up connection or a wireless connection. Standard commercially available security software is also presently employed to protect the information transferred between the customer computer 1106 and the HSI server 1101 as well as to protect the data stored in the database 1103.

The described embodiments of this invention are to be considered in all respects only as illustrative and not as restrictive. Although specific flow diagrams are provided, the invention is not limited thereto. The scope of this invention is, therefore, indicated by the claims rather than the foregoing description. All changes, which come within the meaning and range of equivalency of the claims, are to be embraced within their scope.

What is claimed is:

1. A method for improving a web-based inventory control system to more accurately establish a next order of a customer, the method comprising:
    (a) identifying, by a web-based inventory control system executing on one or more processors, a number of procedures of a customer for a predetermined time period for a next order date, the number of procedures using one or more items;
    (b) establishing, by the web-based inventory control system, a waste factor for the procedure based at least on a beginning inventory quantity over a previous predetermined time period, an ending inventory quantity over the previous predetermined time period, the number of procedures performed over the previous predetermined time period and a number of one or more items used to perform the number of procedures over the previous predetermined time period;
    (c) establishing, by the web-based inventory control system, a usage factor established based at least on a quantity of the one or more items purchased over a previous predetermined time period, the waste factor and the number of procedures performed over the previous predetermined time period and the number of one or more items used to perform the number of procedures over the previous predetermined time period;
    (d) determining, by the web-based inventory control system, a customer order identifying an estimated amount of the one or more items to order for the predetermined time period based on identification of the number of procedures of the customer forecasted for the predetermined time period, a current inventory level of the one or more items for the procedure, the usage factor and the waste;
    (e) receiving, by the web-based inventory control system via an interface, a submission of an order, the order populated by the web-based inventory control system with the customer order based at least on the determination; and
    (f) updating, by the web-based inventory control system, the current inventory level of the one or more items for the procedure.

2. The method of claim 1, wherein (a) further comprises receiving identification of the number of procedures of the customer since a last order of the one or more items was placed.

3. The method of claim 1, wherein (a) further comprises receiving identification of the number of procedures of the customer forecasted for the predetermined time period.

4. The method of claim 1, where (a) further comprises receiving identification of an estimated number of procedures of the customer to be performed for the predetermined time period.

5. The method of claim 1, further comprises identifying, via an inventory control module of the web-based inventory control system, one or more items for the procedure.

6. The method of claim 1, wherein (d) further comprises receiving, the web-based inventory control system for the current inventory level, one of an estimated quantity or a calculated on-hand quantity.

7. The method of claim 1, wherein (e) further comprising placing, by the web-based inventory control system, the customer order responsive to receiving the submission.

8. The method of claim 1, further comprising establishing a calculation for the number of items to be used for a future period by taking into account one or more of the following in combination with one of the waste factor or the usage factor: a forecasted number of procedures, a number of additional procedures expected, a quantity of calculated inventory on hand.

9. The method of claim 1, wherein (e) further comprising receiving, by the web-based control system, the submission of the order adjusted by a user via an interface of the web-based control system.

10. The method of claim 1, further comprising generating, by the web-based inventory control system server, an analysis of a current usage and waste factors as compared to actual usage and waster factors and identifies a modification to one of the current usage and waster factors.

11. A system for improving a web-based inventory control system to more accurately establish a next order of a customer, the system comprising:
    one or more processors, coupled to memory;
    a web-based inventory control system executable on the one or more processors and configured to:
        identify a number of procedures of a customer for a predetermined time period for a next order date, the number of procedures using one or more items;
        establish a waste factor for the procedure based at least on a beginning inventory quantity over a previous predetermined time period, an ending inventory quantity over the previous predetermined time period, the number of procedures performed over the previous predetermined time period and a number of one or more items used to perform the number of procedures over the previous predetermined time period;
        establish a usage factor established based at least on a quantity of the one or more items purchased over a previous predetermined time period, the waste factor and the number of procedures performed over the previous predetermined time period and the number of one or more items used to perform the number of procedures over the previous predetermined time period;
        determine a customer order identifying an estimated amount of the one or more items to order for the predetermined time period based on identification of the number of procedures of the customer forecasted for the predetermined time period, a current inventory level of the one or more items for the procedure, the usage factor and the waste;

an interface configured to receive a submission of an order, the order populated by the web-based inventory control system with the customer order based at least on the determination; and wherein the web-based inventory control system is configured to update the current inventory level of the one or more items for the procedure.

12. The system of claim 11, wherein the web-based inventory control system is further configured to receive identification of the number of procedures of the customer since a last order of the one or more items was placed.

13. The system of claim 11, wherein the web-based inventory control system is further configured to receive identification of the number of procedures of the customer forecasted for the predetermined time period.

14. The system of claim 11, wherein the web-based inventory control system is further configured to identification of an estimated number of procedures of the customer to be performed for the predetermined time period.

15. The system of claim 11, wherein an inventory control module of the web-based inventory control system is configured to identify the one or more items for the procedure.

16. The system of claim 11, wherein the web-based inventory control system is further configured to receive for the current inventory level one of an estimated quantity or a calculated on-hand quantity.

17. The system of claim 11, wherein the web-based inventory control system is further configured to place the customer order responsive to receiving the submission.

18. The system of claim 11, wherein the web-based inventory control system is further configured to provide a calculation for the number of items to be used for a future period by taking into account one or more of the following in combination with one of the waste factor or the usage factor: a forecasted number of procedures, a number of additional procedures expected, a quantity of calculated inventory on hand.

19. The system of claim 11, wherein the web-based inventory control system is further configured to receive the submission of the order adjusted by a user via an interface of the web-based control system.

20. The system of claim 11, wherein the web-based inventory control system is further configured to generate an analysis of a current usage and waste factors as compared to actual usage and waster factors and identify a modification to one of the current usage and waster factors.

* * * * *